(12) United States Patent
Carlson

(10) Patent No.: US 6,490,656 B1
(45) Date of Patent: Dec. 3, 2002

(54) RETAINING STATE INFORMATION OF AN ARRAY OF ELEMENTS BY SUBDIVIDING THE ARRAY INTO GROUPS OF ELEMENTS

(75) Inventor: Richard Carlson, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/507,324

(22) Filed: Feb. 18, 2000

(51) Int. Cl.[7] .............................................. G06F 12/00
(52) U.S. Cl. ....................................... 711/133; 711/206
(58) Field of Search ................................. 711/133, 134, 711/136, 206

(56) References Cited

U.S. PATENT DOCUMENTS

| | | | |
|---|---|---|---|
| 5,539,892 A | * 7/1996 | Reininger et al. | 711/207 |
| 5,859,999 A | 1/1999 | Morris et al. | 712/224 |
| 5,860,017 A | 1/1999 | Sharangpani et al. | 712/23 |
| 5,860,147 A | * 1/1999 | Gochman et al. | 711/207 |

OTHER PUBLICATIONS

Wolfe, A., "Patents shed light on Merced's Innards", Electronic Engineering Times, Feb. 15, 1999.

* cited by examiner

Primary Examiner—David L. Robertson

(57) ABSTRACT

Methods improve state information retention when selecting a not-recently-used element in an array of N elements. A first method comprises the steps of subdividing the array of N elements into K groups, selecting a group from among the K groups, selecting an element that is set to a not-recently-used state from the elements in the selected group, and marking the selected element as recently-used. If all the elements in the selected group are marked as recently-used, the method preferably marks all the elements in the selected group, except the selected element, as not-recently-used. Alternately, the method simply marks all the elements in the selected group when all the elements in the selected group are marked as recently-used. The method also preferably cycles through the groups so that a different group is selected each time. A second method comprises the steps of selecting an element that is marked as not-recently-used from the elements in the array, marking the selected element as recently-used and marking all the elements in the array except the selected element as not-recently-used when all the elements in the array are marked as recently-used. A program that comprises components that execute the above methods is embodied on a computer readable medium.

38 Claims, 4 Drawing Sheets

RETAINING STATE INFORMATION OF AN ARRAY OF ELEMENTS BY SUBDIVIDING THE ARRAY INTO GROUPS OF ELEMENTS

TECHNICAL FIELD

The invention relates to digital electronic circuitry. More particularly, the invention relates to digital electronic circuitry implementing a not-recently-used algorithm.

BACKGROUND ART

Typically, a microprocessor's translation look-aside buffer (TLB) does not contain enough entries to map all currently active virtual addresses to their corresponding physical addresses. Instead, the TLB attempts to cache those mappings which are most likely to be used in the near future. When a memory reference misses the TLB and must install a new TLB entry, the TLB must choose which existing entry should be replaced. The system will have fewer total TLB misses (and therefore higher performance) if the TLB always replaces those entries which will not be referenced for the longest time into the future.

Unfortunately, since the TLB cannot know a program's future behavior, its best guess usually comes from the program's recent history. One method which typically exhibits very good behavior is the least-recently-used (LRU) method, in which enough status information is stored so that the TLB always knows which entry was referenced the least recently. By extrapolation, that entry will probably not need to be referenced for the longest time into the future, and so is the best candidate for replacement. However, the LRU method's complexity and storage requirements grow even faster than the number of entries in the TLB; so for large TLBs, the LRU method's cost can be prohibitive.

Other solutions have been devised which are nearly as effective as the LRU method, but have significantly less cost. One such method is the not-recently-used (NRU) method, in which only one bit of status is kept for each TLB entry. When an entry is referenced, it is marked recently used. When all of the TLB entries have been marked recently used, they are all again reset to the not-recently-used state. When a replacement is needed, any one of the not-recently-used entries may be chosen. This method is simpler than the LRU method, its complexity grows only linearly with the size of the TLB, and it typically has good performance. However, searching for a replacement choice across all of the TLB entries can still be difficult in a large TLB. Also, all history is lost whenever all of the entries become recently used, and poor replacement choices (entries very recently used, or even just newly inserted) may be made at those times. This not only has a negative impact on system performance, but can also (in extreme situations) prevent forward progress.

SUMMARY OF INVENTION

In one respect, the invention is a method for improving state information retention when selecting a not-recently-used element in an array of N elements. The array may be one dimensional or multidimensional. The method comprises the steps of subdividing the array of N elements into K groups, selecting a group from among the K groups, selecting an element that is set to a not-recently-used state from the elements in the selected group, and marking the selected element as recently-used. If all the elements in the selected group are marked as recently-used, the method preferably marks all the elements in the selected group, except the selected element, as not-recently-used. Alternately, the method simply marks all the elements in the selected group when all the elements in the selected group are marked as recently-used. The method also preferably cycles through the groups so that a different group is selected each time.

In another respect, the invention is a method which comprises the steps of selecting an element that is marked as not-recently-used from the elements in the array, marking the selected element as recently-used and marking all the elements in the array except the selected element as not-recently-used when all the elements in the array are marked as recently-used.

In yet another respect, the invention is a computer readable medium on which is embedded a program. The embedded program comprises components that execute the above methods.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
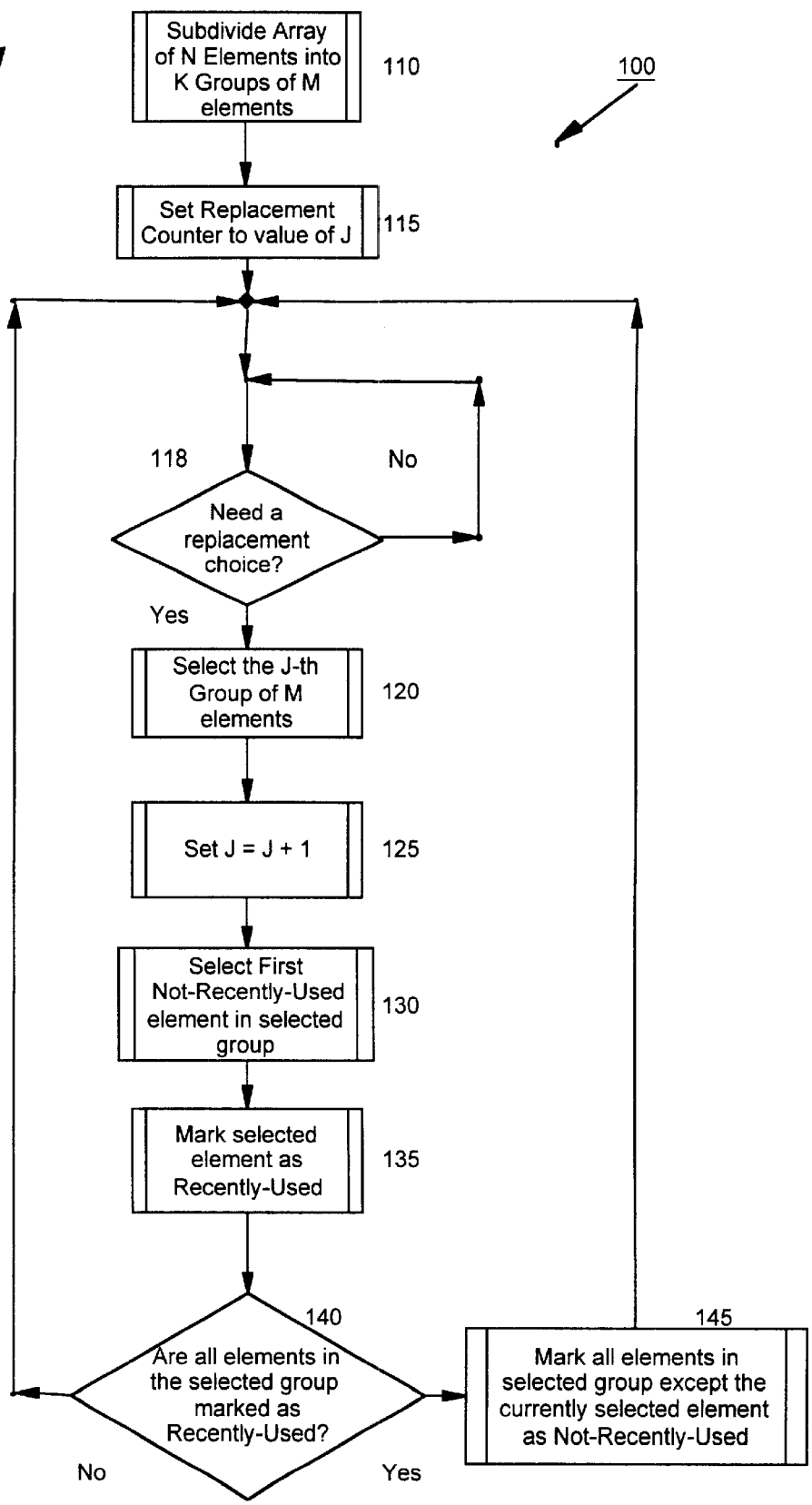
FIG. 1 is a flowchart of a method according to one embodiment of the invention.

FIG. 1 is a flowchart of a method 100 according to one embodiment of the invention. The method of the invention seeks to improve the retention of state information for arrays, particularly translation lookaside buffers, processed in an integrated circuit, particularly in a microprocessor. In one embodiment of the invention, the method 100 begins by subdividing the N elements of an array into K groups of elements (step 110). The number of elements in each group may optionally be equal to that in all other groups, and of the value M. The method 100 then proceeds by setting a replacement counter to a value J (step 115), where J is typically initialized at 1. The value of J generally has as its upper limit the value of K, the number of groups of elements.

The method 100 waits at a testing step 118. When a replacement choice is needed, for example, when a new entry is to be written into the array, the method 100 then performs a group selection step 120 wherein it selects the J-th group of M elements. The replacement counter is incremented by one (step 125) so that the method 100 will select the next group of M elements on its next pass. The method 100 then selects the first element in the selected group that is marked as Not-Recently-Used (step 130). Alternatively, other embodiments of the invention may select any of the elements, not simply the first one, in the selected group that is marked Not-Recently-Used. The method 100 then marks the selected element as Recently-Used (step 135). If all the elements in the selected group are marked as Recently-Used (step 140) then the method 100 marks all the elements in the selected group, except for the element marked as Recently-Used on the current pass through the method 100, as Not-Recently-Used (step 145). Otherwise, the method 100 returns to the group selection step 120 and repeats steps 120 through 140. Alternatively, at the marking step 145, other embodiments of the invention may mark all elements in the selected group as Not-Recently-Used, including the one marked as Recently-Used on the current pass, if all elements in the selected group have been marked as Recently-Used.

Figure 2:
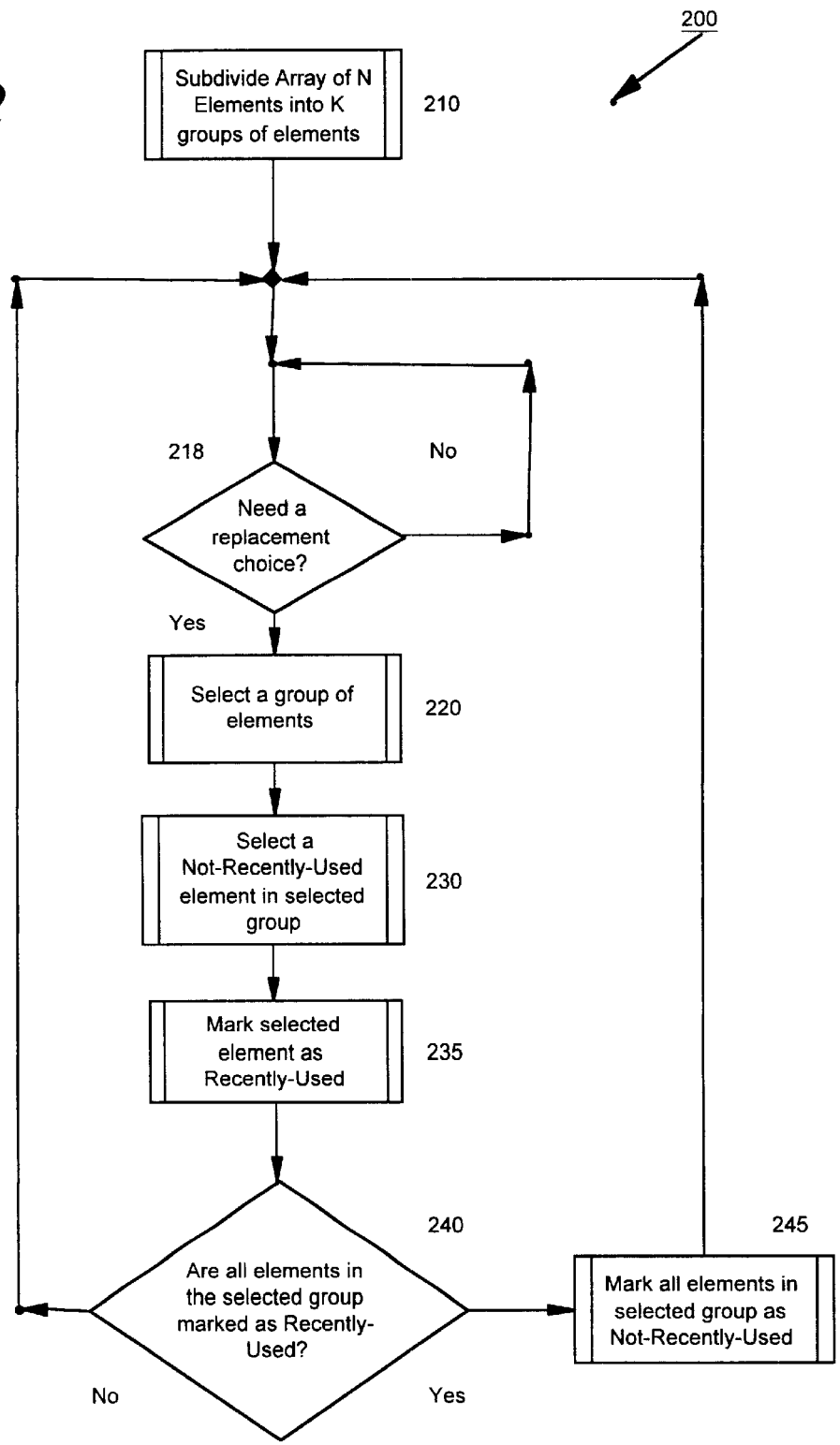
FIG. 2 is a flowchart of a method according to another embodiment of the invention.

FIG. 2 is a flowchart that illustrates the method 200 of another embodiment of the invention. The method 200 incorporates the grouping features of the invention and begins by subdividing an array of N elements into K groups of elements (step 210). When a replacement choice is needed, the method 200 exits a testing step 218 and then selects a group of elements from among the K groups (step 220). From the elements in the selected group, an element that is marked as Not-Recently-Used is selected (step 230). The selected element is then marked as Recently-Used (step 235). Following the marking step 235, the elements of the selected group are checked to determine if they have all been marked as Recently-Used (step 240). If all elements in the group have been marked Recently-Used, then the method 200 marks all the elements in the selected group as Not-Recently-Used (step 245) and returns to the step 220 of selecting another group of elements. Otherwise, the method simply returns to the step 220 of selecting another group of elements. The grouping of elements allows the method 200 to significantly improve the state retention of the Not-Recently-Used algorithm. Testing of this method indicates that for an array of 128 elements, a grouping resulting in sixteen groups of eight elements yields excellent performance.

Figure 3:
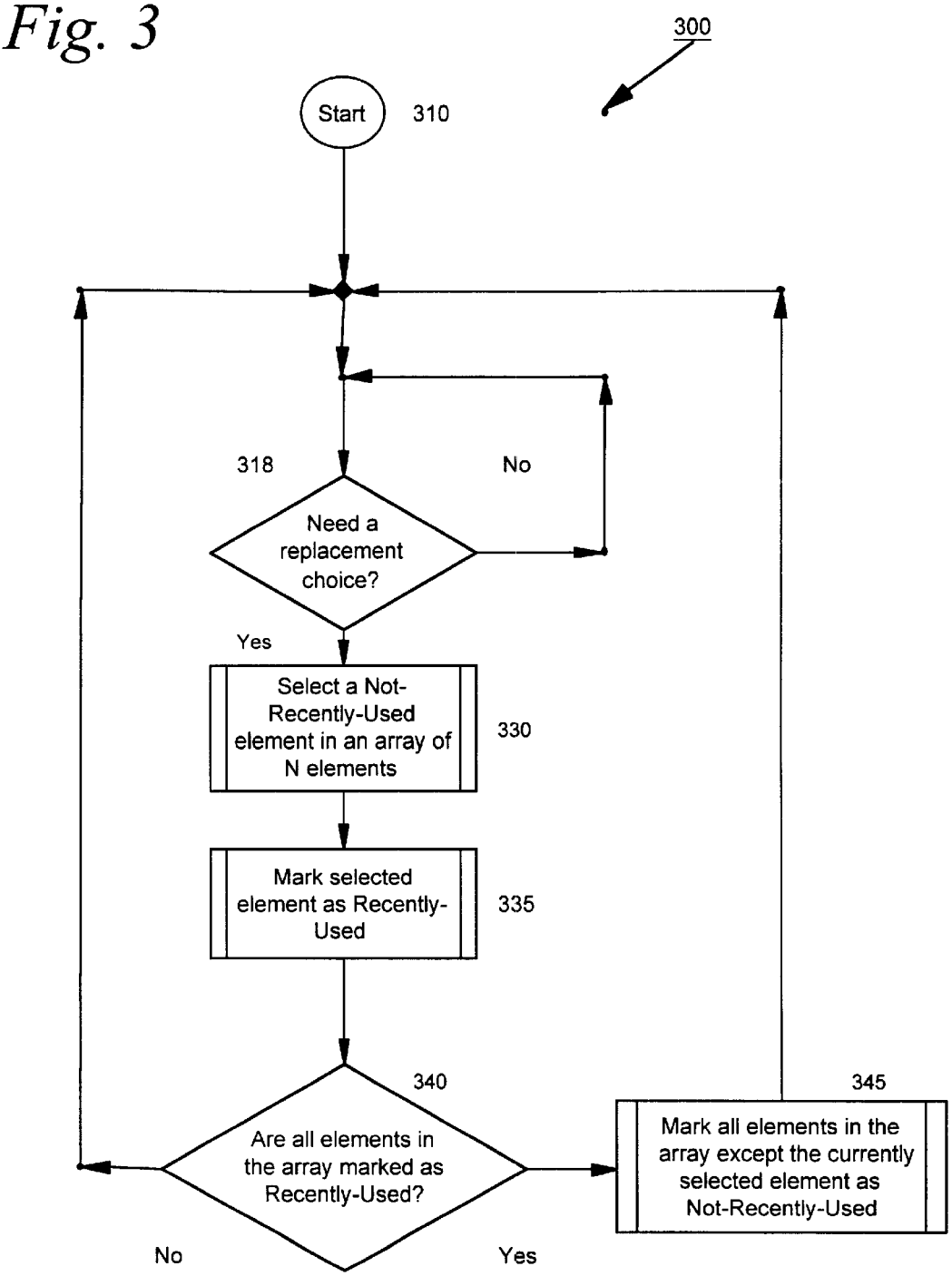
FIG. 3 is a flowchart of a method according to yet another embodiment of the invention.

FIG. 3 is a flowchart that illustrates the method 300 of another embodiment of the invention. This embodiment incorporates a most recent state change retention feature. The method 300 initializes (step 310) and then proceeds directly to a testing step 318. When a replacement choice is needed, the method 300 selects (step 330) an element that is marked as Not-Recently-Used from among the N elements of an array. The selected element is then marked as Recently-Used (step 335). The method 300 tests to determine if all N elements in the array are marked as Recently-Used (step 340). If all N elements in the array are marked as Recently-Used, the method 300 then marks all the elements in the array as Not-Recently-Used, except for the currently selected element (step 345). Following this marking of all but one of the elements in the array, the method 300 returns to the step 330 of selecting another Not-Recently-Used element. Otherwise, the method 300 simply returns to the step 330 of selecting another Not-Recently-Used element. By not marking as Not-Recently-Used the last element to be marked as Recently-Used, the method 300 improves on the state retention characteristics of the Not-Recently-Used algorithm.

Figure 4:
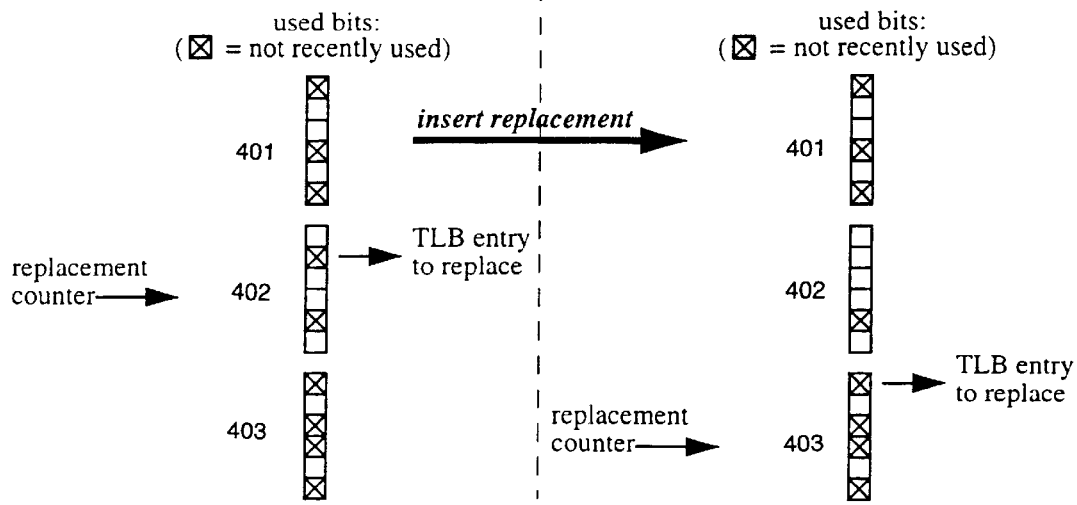
FIGS. 4 and 5 are illustrations of the method of FIG. 1 in action.
Figure 5:
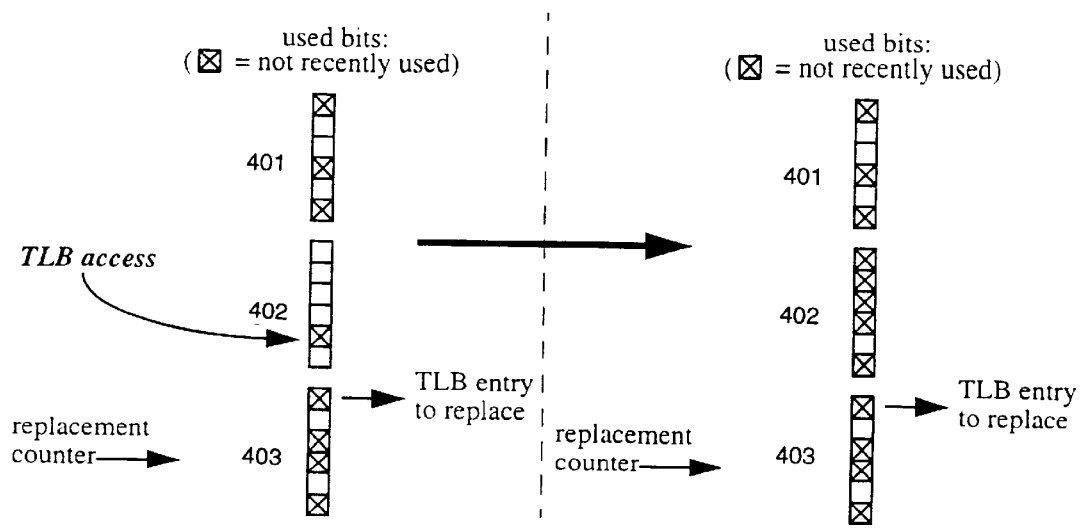

FIGS. 4 and 5 illustrate the method 100 in action. FIG. 4 depicts two states of a TLB—before and after one iteration of the steps 120–135 of the method 100. The before state is shown on the left, and the after state is shown on the right. The TLB in this example has been subdivided into three groups 401, 402 and 403, each of size six (i.e., N=18, K=3, M=6). In the before state, the value of the replacement counter is two (i.e., J=2), and the selecting step 130 has identified the second element as the first Not-Recently-Used element in the group 402. The marking step 135 marks this element as Recently-Used, as the corresponding entry in the TLB is replaced. The incrementing step 125 moves the replacement counter to reference the next group, group 403.

FIG. 5 depicts another set of before and after states of a TLB with respect to the steps 140–145 of the method 100. The before state is shown on the left of FIG. 5 is the same as the after state in FIG. 4. In the before state, it is assumed that the TLB for some reason accesses the sole Not-Recently-Used element of the group 402. Hence, the testing step 140 answers "YES" and proceeds to the marking step 145. The marking step 145 marks the other five elements of the group 403 as Not-Recently-Used.

The steps of the methods 100, 200 and 300 can be implemented with hardware or by execution of programs, modules or scripts (all of which are herein referred to as "programs"). The programs can be stored or embodied on one or more computer readable mediums in a variety of formats, such as source code, object code executable code, microcode, or a hardware description language (HDL), for example. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the invention can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest reasonable sense unless otherwise indicated.

What is claimed is:

1. A method for improving state information retention when selecting a not-recently-used element in an array of N elements, the method comprising:
   maintaining a replacement counter;
   determining a value J of the replacement counter;
   subdividing the array of N elements into K groups;
   selecting a J-th group from among the K groups;
   selecting an element that is marked as not-recently-used from the elements in the J-th group; and
   marking the selected element as recently-used.

2. The method claim 1 further comprising:
   if all the elements in the selected group are marked as recently-used, marking all the elements in the selected group as not-recently-used.

3. The method claim 1 further comprising:
   if all the elements in the selected group are marked as recently-used, marking all the elements in the selected group, except the selected element, as not-recently-used.

4. The method of claim 1 wherein the selected element is the first element in the selected group marked as not-recently-used.

5. The method of claim 1, wherein the step of selecting a group from among the K groups further comprises:
   incrementing the replacement counter by 1.

6. The method of claim 5 wherein the replacement counter is set to a value of 1 at the beginning of the method and is set to 1 after the replacement counter reaches an upper limit of K.

7. The method of claim 1 wherein the K groups of elements all contain an equal number of elements, M.

8. The method of claim 7 wherein N is 128, K is 8, and M is 16.

9. The method of claim 1 wherein the array is a translation lookaside buffer containing address mappings.

10. A method for retaining state information retention when selecting a not-recently-used element in an array of N elements, the method comprising:

maintaining a replacement counter;

determining a value J of the replacement counter;

subdividing an array of N elements into K groups;

selecting a J-th group from among the K groups;

selecting an element that is marked as not-recently-used from the elements in the J-th group;

marking the selected element as recently-used; and marking all the elements in the selected group, except the selected element, as not-recently-used in response to all the elements in the selected group being marked as recently used.

11. The method of claim 10, wherein the step of selecting a group of elements further comprises:

incrementing the replacement counter by 1.

12. The method of claim 11 wherein the replacement counter is set to a value of 1 at the beginning of the method and is set to 1 after the replacement counter reaches an upper limit of K, the number of groups.

13. The method of claim 11 wherein the K groups of elements all contain an equal number of elements, M.

14. The method of claim 13 wherein N is 128, K is 8, and M is 16.

15. The method of claim 10 wherein the array is a translation lookaside buffer containing address mappings.

16. A computer readable medium on which is embedded a program, the program comprising components that execute a method for improving state information retention when selecting a non-recently-used element in an array of N elements, the method comprising:

maintaining a replacement counter;

determining a value J of the replacement counter;

subdividing the array of N elements into K groups;

selecting a J-th group from among the K groups;

selecting an element that is set to a not-recently-used from the elements in the J-th group; and marking the selecting element as recently-used.

17. The computer readable medium of claim 16 wherein the method further comprises:

if all the elements in the selected group are marked as recently-used, marking all the elements in the selected group as not-recently-used.

18. The computer readable medium of claim 16 wherein the method further comprises:

if all the elements in the selected group are marked as recently-used, marking all the elements in the selected group, except the selected element, as not-recently-used.

19. The computer readable medium of claim 14, wherein the step of selecting a group of elements comprises:

incrementing the replacement counter by 1.

20. A method for retaining state information when selecting a not-recently-used element in an array of N elements, the method comprising:

subdividing an array of N elements into K groups;

selecting a group from among the K groups;

selecting an element that is marked as not-recently-used from the elements in the selected group;

marking the selected element as recently used;

setting a replacement counter to a value of J;

electing the J-th group of elements; and incrementing the replacement counter by 1.

21. The method according to claim 20, wherein the replacement counter is set to a value of 1 at the beginning of the method and is set to 1 after the replacement counter reaches an upper limit of K.

22. The method according to claim 20, wherein the K groups of elements all contain an equal number of elements, M.

23. The method according to claim 22, wherein N is 128, K is 8, and M is 16.

24. The method according to claim 20, wherein the array is a translation lookaside buffer containing address mappings.

25. The method according to claim 20, further comprising:

marking all the elements in the selected group as not-recently-used in response to all the elements in the selected group being marked as recently-used.

26. The method according to claim 20, further comprising:

marking all the elements in the selected group, except the selected element, as not-recently-used in response to all the elements in the selected group being marked as recently-used.

27. The method according to claim 20, wherein the selected element is a first element in the selected group as not-recently-used.

28. An apparatus for retaining state information when selecting a not-recently-used element in an array of N elements, the apparatus comprising:

means for subdividing an array of N elements into K groups;

means for selecting a group from among the K groups;

means for selecting an element that is marked as not-recently-used from the elements in the selected group;

means for marking the selected element as recently used;

means for setting a replacement counter to a value of J;

means for selecting the J-th group of elements; and incrementing the replacement counter by 1.

29. The apparatus according to claim 28, further comprising:

means for marking all the elements in the selected group as not-recently-used in response to all the elements in the selected group being marked as recently-used.

30. The apparatus according to claim 28, further comprising:

means for marking all the elements in the selected group, except the selected element, as not-recently-used in response to all the elements in the selected group being marked as recently-used.

31. A method for retaining state information when selecting a not-recently-used element in an array of N elements, the method comprising:

subdividing the array of N elements into K groups;

selecting a group from among the K groups;

selecting an element which is marked as not-recently-used from the elements in the selected group;

marking the selected element as recently-used;

marking all the elements in the selected group, except the selected element, as not-recently-used in response to all the elements in the selected group being marked as recently used;

setting a replacement counter to a value of J;

selecting the J-th group of elements; and incrementing the replacement counter by 1.

32. The method of claim 31, wherein the replacement counter is set to a value of 1 at the beginning of the method and is set to 1 after the replacement counter reaches an upper limit of K, the number of groups.

33. The method of claim 31, wherein the K groups of elements all contain an equal number of elements, M.

34. The method of claim 33, wherein N is 128, K is 8, and M is 16.

35. The method of claim 31, wherein the array is a translation lookaside buffer containing address mappings.

36. A computer readable medium on which is embedded a program, the program comprising components that execute a method for retaining state information when selecting a not-recently-used element in an array of N elements, the method comprising:

subdividing an array of N elements into K groups;

selecting a group from among the K groups;

selecting an element that is set to a not-recently-used state from the elements in the selected group;

marking the selected element as recently-used;

setting a replacement counter to a value of J;

selecting the J-th group of elements from the group; and incrementing the replacement counter by 1.

37. The computer readable medium according to claim 36, further comprising:

marking all the elements in the selected group as not-recently-used in response to all the elements in the selected group being marked as recently used.

38. The computer readable medium according to claim 36, further comprising:

marking all the elements in the selected group, except the selected element, as not-recently-used in response to all the elements in the selected group being marked as recently used.

\* \* \* \* \*